Aug. 28, 1962 — C. HELWIG — 3,051,151
CRANKCASE VENTILATOR FOR AUTOMOTIVE VEHICLES
Filed Aug. 28, 1961 — 2 Sheets-Sheet 1
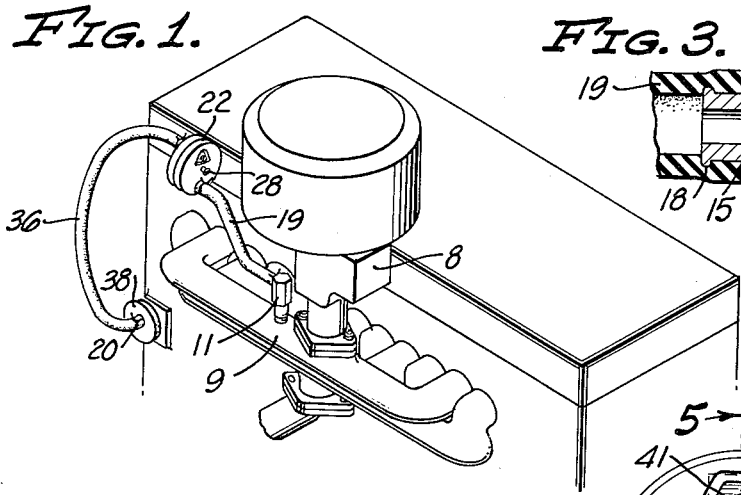
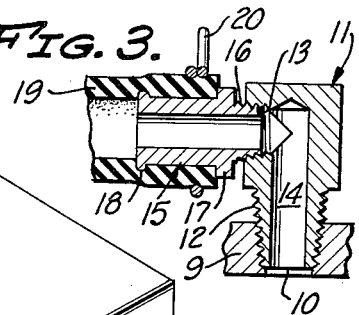
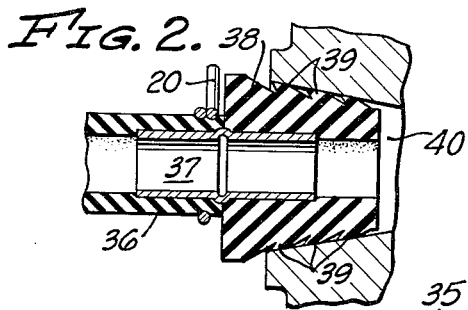
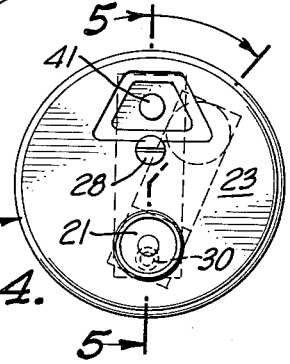
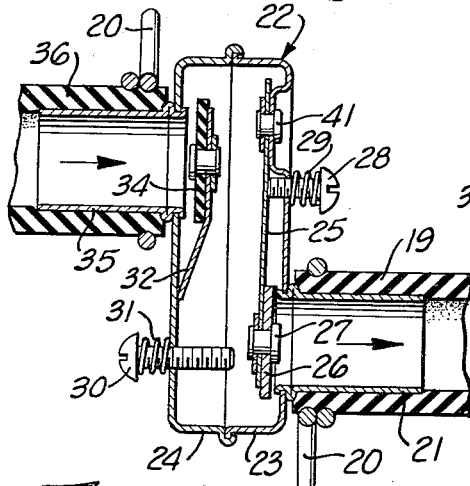
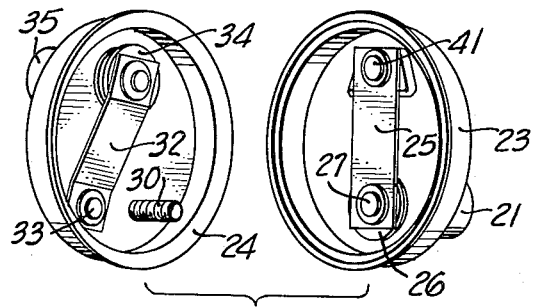
INVENTOR.
CARL HELWIG
BY Robert C. Comstock
ATTORNEY Aug. 28, 1962  C. HELWIG  3,051,151
CRANKCASE VENTILATOR FOR AUTOMOTIVE VEHICLES
Filed Aug. 28, 1961  2 Sheets-Sheet 2
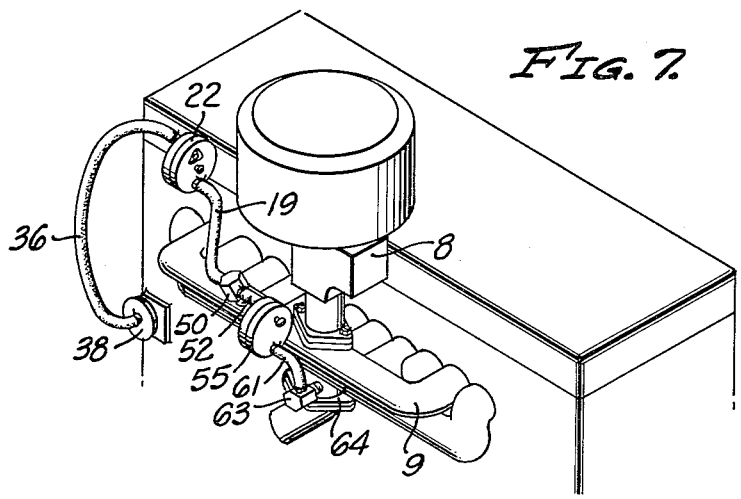
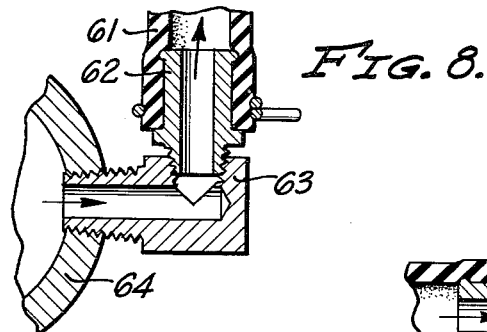
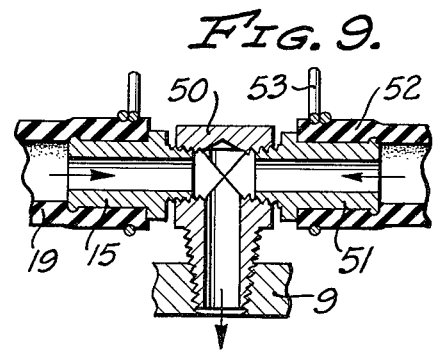
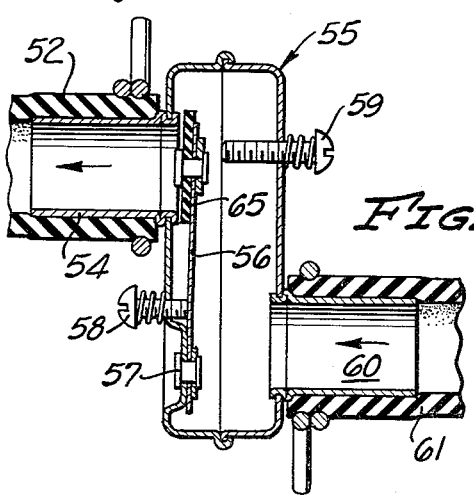
INVENTOR.
CARL HELWIG
BY
ATTORNEY

United States Patent Office 3,051,151
Patented Aug. 28, 1962

3,051,151
CRANKCASE VENTILATOR FOR AUTOMOTIVE
VEHICLES
Carl Helwig, 2601 San Fernando Road,
Los Angeles 65, Calif.
Filed Aug. 28, 1961, Ser. No. 134,522
7 Claims. (Cl. 123—119)

This invention relates to a crankcase ventilator for automotive vehicles.

It is an object of my invention to provide a ventilator which is adapted to be quickly and easily installed on existing automobile vehicles for the purpose of providing accurately controlled ventilation of the crankcase. This ventilation takes oil fumes from the crankcase and carries them back to the carburetor, resulting in increased gasoline mileage due to the recovery of a formerly wasted source of fuel. It also removes the same fumes from the exhaust, reducing the creation of smog through operation of the vehicle. My invention accordingly increases the operating efficiency of the vehicle and reduces its exhaust gases.

It is a more particular object of my invention to provide a universal crankcase ventilator kit which can be utilized by an automobile mechanic of average skill to install my crankcase ventilator on substantially any make or model of automotive vehicle.

Another object of my invention is to provide such a kit which is capable of being manufactured economically and installed quickly so that its cost of manufacture and installation are well within the budget of substantially every driver of automotive vehicles.

It is also among the objects of my invention to provide a crankcase ventilator kit which is simpler and easier to install than other such devices which are now in use.

Yet another object of my invention is to provide a crankcase ventilator which is simpler and more efficient in its construction than similar devices now in use and which will last longer and will not become sludged up or rendered inoperable in use.

Another object of my invention is to provide a device which is also capable of being used to carry exhaust gases from the exhaust manifold of the vehicle back to the intake manifold. My device may be so used either alone or in combination with another device used as a crankcase ventilator. It has been found that the combination of the two devices is particularly effective in improving the gasoline mileage of the vehicle.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings:

FIG. 1 is a perspective view of a portion of an automotive vehicle engine, showing my crankcase ventilator in use thereon;

FIG. 2 is an enlarged detailed sectional view of the connection of the ventilator to the road draft port;

FIG. 3 is an enlarged detailed sectional view of the connection of the ventilator to the intake manifold;

FIG. 4 is an enlarged side elevational view of the valve control member;

FIG. 5 is an enlarged detailed sectional view taken on lines 5—5 of FIG. 4, showing both of the leaf springs in section;

FIG. 6 is a perspective view of the inside of the two parts of the valve control member which is shown in section in FIG. 5;

FIG. 7 is a perspective view of an alternative embodiment of my invention, showing a portion of an automotive vehicle engine, with my crankcase ventilator in use in combination with a second valve control member for carrying heated air from the exhaust manifold back to the intake manifold;

FIG. 8 is an enlarged sectional view of the connection of this embodiment of my invention to the exhaust manifold;

FIG. 9 is an enlarged sectional view of the T-fitting connection of this embodiment of my invention to the intake manifold;

FIG. 10 is an enlarged sectional view of the second valve control member of this embodiment of my invention.

A preferred embodiment which has been selected to illustrate my invention is connected at one end to the intake manifold 9 of the automotive vehicle. Referring to FIG. 3 of the drawings, an opening 10 is drilled into the intake manifold as close to the base of the carburetor 8 as possible. Care must be taken not to drill the opening 10 into the exhaust passage which runs through many manifolds. A self-tapping fitting 11, which is part of my crankcase ventilator kit, has a screw threaded lower end 12, which is inserted into the opening 10.

The upper end of the fitting 11 is provided with an internally screw threaded opening 13, which extends horizontally inwardly from the side of the fitting 11 and connects with a passage 14, which extends downwardly through the screw threaded lower end 12.

A hollow hose connector 15 has an externally screw threaded end 16 which fits within the opening 13 in the fitting 11. The connector 15 has a hexagonal flange 17 which is disposed adjacent to the screw threaded end 16. The end of the connector 15 remote from the end 16 is provided with an annular bead 18.

A hose 19 is preferably formed of oil and gasoline resistant material such as neoprene. One end of the hose 19 fits over the unthreaded end of the connector 15. The hose 19 fits over the bead 18 and abuts against the flange 17. A circular spring clip 20 fits around the end of the hose 19 to secure it firmly to the connector 15.

The opposite end of the hose 19 is connected to the hollow outlet tube 21 of a valve control member 22. The hose 19 is held in place by another spring clip 20. The valve control member 22 includes a casing having two parts 23 and 24, which are secured together. The outlet tube 21 is connected to the casing part 23.

Mounted within the casing part 23 is an elongated leaf spring 25, one end of which is secured to the casing part 23 by a rivet 41. The opposite end of the leaf spring 25 carries a circular metal seal 26, which is secured thereto by a rivet 27. The seal 26 is disposed adjacent to the inner end of the outlet tube 21 and is normally urged by the leaf spring 25 toward a position in which it engages and closes off the inner end of the outlet tube 21.

A first adjusting screw 28 extends through the casing part 23 so that its inner end engages the end of the leaf spring 25 adjacent to the rivet 41. The head of the screw 28 is slotted to permit its adjustment by use of a screwdriver. A coil spring 29 surrounds the shank of the screw 28 between the head and the casing part 23 to prevent accidental or undesirable rotation of the screw 28 and hold it in the position to which it is adjusted.

A second adjusting screw 30 extends through the opposite casing part 24 and has its inner end disposed adjacent to and in alignment with the circular seal 26. The screw 30 is similarly provided with a slotted head and a retaining coil spring 31. It will be noted that the first adjusting screw 28 when moved inwardly acts to move the seal 26 away from the inner end of the outlet tube 21 to permit a small amount of flow through the outlet tube 21. The second adjusting screw 30, when moved inwardly, acts to limit the opening movement of the seal 26 in order to make its subsequent return to closed position more certain.

A second and non-adjustable leaf spring 32 is mounted within the casing part 24 by a rivet 33 which extends through one end of the leaf spring 32. The other end of the spring 32 carries a resilient circular seal 34. The seal 34 is aligned with and disposed adjacent to the inner end of an inlet tube 35, which is connected to the casing part 24. The leaf spring 32 is bent so that the seal 34 is normally spaced a substantial distance away from the inner end of the inlet tube 35, as shown in FIG. 5 of the drawings.

A second hose 36 is connected at one end to the inlet tube 35 and held there by a spring clip 20. The opposite end of the second hose 36 fits over one half of a hollow connector 37 and is held thereon by a spring clip 20. The other half of the connector 37 fits within a resilient plug 38, the outer periphery of which is provided with serrations 39 which frictionally engage the inner walls of the road draft port 40 of the automotive vehicle, from which the road draft tube has first been removed.

These comprise all of the portions of my crankcase ventilator and kit. In order to adjust the ventilator after it has been installed in the manner described, the motor of the vehicle is warmed up and a vacuum gauge is used with the engine at idle speed. The first adjusting screw 28 is tightened until the vacuum gauge gives a reading ¼" to ½" less than the normal reading. This does not adversely affect the idling operation of the vehicle.

The vehicle is then put in gear and the motor speed increased slowly until the leaf spring 25 opens. This is indicated by a sharp decrease in the vacuum gauge reading. After the spring 25 opens, the motor speed is decreased slowly to idle and the second adjusting screw 30 is tightened until the spring 25 closes. The closing of the spring 25 can be heard and is also indicated by a sharp increase in the vacuum indication on the gauge. The engine speed is then increased and decreased slowly several times to be certain that the spring 25 just closes as the engine returns to idling speed. The second screw 30 is then tightened three additional rotations.

The purpose of the second adjusting screw 30 is to prevent the spring 25 from opening too far and to make certain that it returns to its closed position. The setting of the second adjusting screw should be such that the spring 25 will return to its closed position when the vacuum is in the range from six inches to twelve inches. The closing of the spring 25 cuts off the supply of air to the intake manifold, to prevent malfunctioning of the engine due to too lean a mixture.

It should be noted that when the motor of the vehicle is at idle speed, the adjusting screw 28 holds the seal 26 a slight distance away from the inner end of the outlet tube 21, despite the high vacuum which urges the seal 26 toward closed position. When the motor is accelerated, the amount of vacuum is decreased and the spring 25 moves the seal 26 a substantial distance away from the outlet tube 21 and into engagement with the inner end of the second adjusting screw 30. When the motor is decelerated back toward idle, the vacuum increases and moves the seal 26 back toward the outlet tube 21 against the pressure of the leaf spring 25.

The leaf spring 32 is a safety precaution to prevent a backfire from going back to the crankcase, which contains explosive gases. A backfire will move the seal 34 into sealing engagement with the inlet tube 35, to prevent the backfire from reaching the crankcase.

Referring to FIGS. 7–10 of the drawings, a second device of substantially the same construction described above can be installed on the vehicle simultaneously with the crankcase ventilator to carry a limited amount of heated air from the exhaust manifold to the intake manifold. This combination results in a saving of gasoline and a corresponding increase in the miles per gallon ratio of the vehicle, particularly at speeds under 50 miles per hour.

This construction is extremely similar to the one described above and will accordingly be summarized briefly. It utilizes a T-fitting 50, which extends into an opening in the intake manifold. A crankcase ventilator is connected to one side of the T-fitting 50. Since this ventilator is identical with the device described above, the same reference numbers have been utilized. Connected to the other side is a connector 51, to which one end of a hose 52 is held by a spring clip 53. The opposite end of the hose 52 is connected to the outlet tube 54 of a second valve control member 55. Mounted within the second valve control member 55 is a leaf spring 56, which is held by a rivet 57. The leaf spring 56 carries at its opposite end a seal 65, which is adapted to close off the outlet tube 54. A first adjusting screw 58 and second adjusting screw 59 are constructed and function in the same manner described above. There is no second or backfire spring utilized in the second valve control member 55.

The inlet tube 60 of the second valve control member 55 is connected to one end of a second hose 61, the opposite end of which is secured to a connector 62. The connector 62 is screw threadedly connected to a self-tapping fitting 63, which extends into an opening drilled into the exhaust manifold 64.

In use, it has been found that the combined action of the crankcase ventilator and controlled return from the exhaust manifold provides improved gasoline mileage for the vehicle.

I claim:
1. A device of the class described for automotive vehicle engines of the type having an intake manifold and a crankcase, said device comprising a fitting screw threadedly extending into an opening in the intake manifold, a hose having one end thereof connected to said fitting, a valve control member having an inlet tube on one side thereof and an outlet tube on the other side, the opposite end of said hose being connected to said outlet tube, an elongated leaf spring mounted within said control member and secured at one end thereof to said control member, a seal carried by the opposite end of said leaf spring, said seal being adapted to close off said outlet tube, a first adjusting screw mounted on one side of said control member and adapted to engage one side of said leaf spring between the ends thereof to move said seal away from said outlet tube, a second adjusting screw mounted on the opposite side of said control member and adapted to engage the other side of said leaf spring adjacent to said seal to limit the movement of said seal away from said outlet tube, a second hose having one end thereof connected to said inlet tube, the opposite end of said hose being connected to a resilient hollow plug, said plug having external serrations engaging the walls of an opening in the crankcase.

2. The structure described in claim 1 and a second leaf spring mounted within said valve control member, said leaf spring having a seal at one end thereof adapted to close off said inlet tube, said second leaf spring being bent so that said inlet tube is normally open, said spring adapted to be flexed to move said seal and close off said inlet tube to prevent a backfire from passing through said control member into the crankcase of the vehicle.

3. A device of the class described for automotive vehicle engines of the type having an intake manifold and a crankcase, said device comprising a fitting extending into an opening in the intake manifold, a hose having one end thereof connected to said fitting, a valve control member having an inlet tube and an outlet tube, the opposite end of said hose being connected to said outlet tube, an elongated leaf spring mounted within said control member, a seal carried by said leaf spring, said seal being adapted to close off said outlet tube, a first adjusting screw on said control member adapted to engage one side of said leaf spring between the ends thereof to move said seal away from said outlet tube, a second adjusting screw on said control member adapted to engage the other side of said leaf spring adjacent to said seal to limit the movement of said seal away from said outlet tube, a second hose having one end thereof connected to said inlet tube, the opposite end of said hose being connected to a resilient hollow plug, said plug frictionally engaging the walls of an opening in the crankcase.

4. A device of the class described for automotive vehicle engines of the type having an intake manifold and a crankcase, said device comprising a fitting connected to the intake manifold, a hose having one end thereof connected to said fitting, a valve control member having an inlet and an outlet, the opposite end of said hose being connected to said outlet, an elongated leaf spring mounted within said control member, a seal carried by said leaf spring, said seal being adapted to close off said outlet, a first adjusting screw on said control member adapted to engage said leaf spring to move said seal away from said outlet, a second adjusting screw on said control member adapted to limit the movement of said seal away from said outlet, a second hose having one end thereof connected to said inlet, the opposite end of said hose being connected to a resilient hollow plug, said plug being connected to the crankcase.

5. A device of the class described for automotive vehicle engines of the type having an intake manifold and a crankcase, said device comprising a valve control member having an inlet connected to the crankcase and an outlet connected to the intake manifold, an elongated leaf spring mounted within said control member, a seal carried by said leaf spring adapted to close off said outlet, a first adjusting screw on said control member adapted to move said seal away from said outlet and a second adjusting screw on said control member adapted to limit the movement of said seal away from said outlet.

6. The structure described in claim 5, said engine having an exhaust manifold, and a valve control member having an inlet connected to the exhaust manifold and an outlet connected to the intake manifold, an elongated leaf spring mounted within said second control member, a seal carried by said leaf spring adapted to close off the outlet of said second control member, and an adjusting screw on said second control member adapted to move said seal away from the outlet of said second control member.

7. In an automotive vehicle engine of the type having an intake manifold, an exhaust manifold and a crankcase, a first valve control member having an inlet connected to the crankcase and an outlet connected to the intake manifold, means carried by said valve control member for controlling the flow of gases from the crankcase to the intake manifold and a second valve control member having an inlet connected to the exhaust manifold and an outlet connected to the intake manifold, and means carried by said valve control member for controlling the flow of gases from the exhaust manifold to the intake manifold.

References Cited in the file of this patent
UNITED STATES PATENTS

| | | |
|---|---|---|
| 876,066 | Klever | Jan. 7, 1908 |
| 2,853,986 | Kolbe | Sept. 30, 1958 |